United States Patent Office 2,795,630
Patented June 11, 1957

2,795,630

PREPARATION OF TRIALKYLBENZENES

Arthur P. Lien, Highland, Ind., and David A. McCaulay, Chicago, Ill., assignors to Standard Oil Company, Chicago, Ill., a corporation of Indiana No Drawing. Application August 26, 1954, Serial No. 452,444

18 Claims. (Cl. 260—668)

This invention relates to the preparation of certain 1,3,5-trialkylbenzenes. More particularly the invention relates to a process for the transfer of alkyl groups whereby certain polyalkylbenzenes containing at least 4 alkyl groups ae converted to 1,3,5-trialkylbenzenes.

Certain symmetrical trialkylbenzenes are becoming of considerable importance in commercial chemical operations. For example, 1,3,5-ethylxylene is a source of di-methylstyrene and higher softening point styrene polymers. Symmetrical triethylbenzene is of importance as a cross-linking agent when converted to di- and tri-vinylbenzenes. Symmetrical tri-isopropylbenezene is useful as a starting material for the preparation of 1,3,5-trihydroxybenzene. These materials are not found in nature in appreciable quantities and must be synthesized by relatively expensive means.

In the alkylation of benzene with an olefin, not only are the desired mono-alkylate, di-alkylate, and tri-alkylate formed, but also, in many cases, large amounts of poly-alkylates containing 4 or more alkyl groups. In some processes, these higher alkylates may be converted to the desired products by recycle to the feed. HF–BF$_3$ catalyzed alkylation, which has a unique property of producing meta-oriented products and particularly 1,3,5-trialkylbenzenes, produces, under some conditions, appreciable amounts of the polyalkylbenzenes containing 4 or more alkyl groups. Up to this time, it has been believed that HF–BF$_3$ catalyzed reactions invariably produced a meta-oriented product by isomerization or a meta-oriented product having a greater number of alkyl groups on the benzene ring than the charge to the process, i. e., by disproportionation. Owing to this characteristic of the HF–BF$_3$ system, it has not been possible to recycle polyalkylbenzenes containing 4 or more alkyl groups and convert these to the more desirable trialkylbenzenes. This failure has imposed an economic disability on HF–BF$_3$ processing.

An object of this invention is a process for the preparation of certain 1,3,5-trialkylbenzenes. Another object is a process wherein certain polyalkylbenzenes containing at least 4 alkyl groups are converted to polyalkylbenzenes having a lesser number of alkyl groups. A particular object is an alkyl group transfer process wherein certain polyalkylbenzenes containing at least 4 alkyl groups are converted to 1,3,5-trialkylbenzenes. Other objects will become apparent in the course of the detailed description.

In the process, an HF–BF$_3$ agent catalyzes the interaction of a defined polyalkylbenzene with an alkyl group receiver to produce a reaction product mixture containing alkylbenzenes having a lesser number of alkyl groups than in the polyalkylbenzene charged and particularly having the 1,3,5-trialkylbenzene configuration.

Previously it had been believed that HF–BF$_3$ catalyzed alkylbenzene reactions invariably produced a reaction product mixture containing alkylbenzenes having a greater number of alkyl groups on an individual benzene ring than were present in the charge alkylbenzene. Since the alkyl transfer process of this invention operates directly contrary to what was previously though as the only mode of operation, this interaction process is referred to as "back up interaction."

To illustrate: By the use of a hereinafter defined amount of HF–BF$_3$ treating agent and hereinafter defined conditions of temperature and time, a mixture consisting of tetraethylbenzene and benzenes having a mole ratio of benzene to tetraethylbenzene of about 1 is converted to a reaction product mixture containing about 80 mole percent of 1,3,5-triethylbenzene.

The polyalkylbenzene charged to the process contains at least 4 alkyl groups and may contain as many as 6, i. e., as many as 1 alkyl group for each ring carbon atom. The process is applicable to the methylbenzenes, ethylbenzenes, isopropylbenzenes, secondary-butylbenzenes, n-propylbenzenes, and isopropylbenzenes. Although it is preferred to operate with a polyalkylbenzene having only one type of alkyl substituent, it is possible to operate with polyalkylbenzenes containing two alkyl substituents, for example, diethyldimethylbenzene and di-isopropyldimethylbenzene. Operation with these mixed polyalkylbenzenes tends to produce a reaction product mixture containing mixed trialkylbenzenes, for example diethyldimethylbenzene preferentially forms 1,3-dimethyl-5-ethylbenzene; di-isopropyldiethylbenzene preferentially forms 1,3-diethyl-5-isopropylbenzene.

It is to be understood that the above listing of alkylbenzenes susceptible to the back-up interaction of this invention and the following discussion does not imply the existence of equivalency between the various alkyl groups unless such equivalency is specifically set out herein. Although certain conditions of the back-up interaction are applicable to all the alkyl groups, other conditions must be varied to such an extent, in order to attain the desired result, that there is essentially no predictability between operations concerning one alkylbenzene and another alkylbenzene, except as hereinafter specifically set forth.

The back-up interaction involves not only a donor polyalkylbenzene but also an alkyl group receiver (acceptor). The alkyl group receivers (acceptors) usable in the process are benzene, toluene, xylene, alkyltoluene, alkylbenzene, and di-alkylbenzene. The alkyl group possessed by the receiver is selected from the class consisting of ethyl, isopropyl, sec-butyl, n-propyl, and n-butyl. In order to avoid the formation of mixed alkylbenzenes, it is preferred to operate with benzene or a receiver having the same type of alkyl group as that present in the polyalkylbenzene donor. The statement made with respect to equivalency of alkyl groups in the donor polyalkylbenzene is also applicable to equivalency of alkyl groups in the receiver alkylbenzene.

The back-up interaction involves the transfer of an alkyl group from a defined polyalkylbenzene containing at least 4 alkyl groups to a benzene hydrocarbon containing not more than 2-alkyl groups, i. e., benzene, mono-alkylbenzene or di-alkylbenzene. It appears that the 1,3,5-trialkylbenzene configuration is the most stable configuration in the presence of liquid HF and BF₃. By suitably adjusting the amount of liquid HF and BF₃ present and the conditions of temperature and time of contacting of the polyalkylbenzene donor, the benzene hydrocarbon receiver and the liquid HF-BF₃ agent, an interaction between the polyalkylbenzene donor and the benzene hydrocarbon receiver takes place, which results in the formation of 1,3,5-trialkylbenzene and other alkylbenzenes containing a smaller number of alkyl groups than the donor charged to the process and a greater number than the benzene hydrocarbon receiver charged to the process. To illustrate: Tetraethylbenzene and benzene interact to form 1,3,5-triethylbenzene and also diethylbenzene and ethylbenzene. Practically the reaction is set out below, ignoring chemical balance.

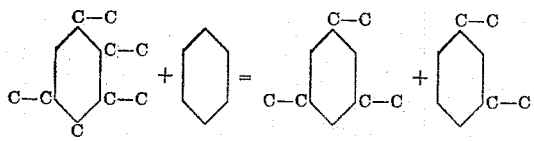

Under the proper conditions of treating agent, temperature and time and relative amounts of donor and receiver, the reaction product mixture contains on the order of 80 mole percent of the 1,3,5-triethylbenzene, the remainder being unreacted benzene, diethylbenzene and mono-ethylbenzene.

With some of the alkyl groups it is possible to virtually extinguish the polyalkylbenzene having 4 or more alkyl groups. In the case of polymethylbenzenes, it is extremely difficult to "back-up" all of the polymethylbenzene charged.

Under proper conditions, it is possible to obtain appreciable amounts of the trialkylbenzene product even when a very large excess of the polyalkylbenzene donor is present in the reaction zone. Increasing the amount of benzene hydrocarbon receiver present increases the yield of trialkylbenzene product. In order to maximize the yield of trialkylbenzene, at least the theoretical amount of benzene hydrocarbon receiver should be present in the reaction zone. Examination of the foregoing depicted interaction of tetraethylbenzene and benzene will show that theoretically ⅓ mole of benzene is needed per mole of tetraethylbenzene charged. The number of alkyl groups present on the polyalkylbenzene donor and the number of alkyl groups present on the benzene hydrocarbon receiver determine the theoretical molar ratio of receiver to donor necessary to maximize the yield of trialkylbenzene product.

A general relationship exists for the theoretical minimum ratio of receiver to donor. This relationship is expressed as $(D-3)/(3-R)$ where D is the number of alkyl groups in the donor polyalkylbenzene and R is the number of alkyl groups in the benzene hydrocarbon receiver. Thus, where the donor is, for example, hexamethylbenzene and the receiver is toluene, it is desirable to operate with a mole ratio of toluene to hexamethylbenzene of 1.5. The theoretical interaction of these two alkylbenzenes is:

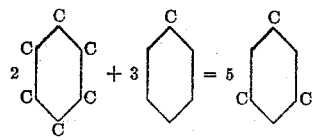

In order to set out the minimum desirable amount of benzene hydrocarbon receiver which should be present in the interaction zone, in a form other than the above, there is set out in Table I the mole ratio of receiver to donor which desirably should be present. It is stressed that the ratios present in Table I assume that all of the polyalkylbenzene donor and all of the benzene hydrocarbon receiver will be converted to trialkylbenzene, which assumption is not completely valid in practical operation.

TABLE I

*Mole ratio receiver/donor*

| Receiver | Donor | | |
|---|---|---|---|
| | tetra- | penta- | hexa- |
| benzene | ⅓ | ⅔ | 1 |
| mono- | ½ | 1 | 1.5 |
| di- | 1 | 2 | 3 |

More than the theoretical amounts set out in Table I are helpful in forcing the interaction toward the desired 100% conversion of the defined polyalkylbenzene to trialkylbenzene. In general, the preferred amount of benzene hydrocarbon receiver is such that at the practical completion of the interaction, essentially all the unconverted, i. e., excess, benzene hydrocarbon receiver is dissolved in the HF-BF₃ acid phase. Benzene and toluene are very slightly soluble in HF-BF₃ acid phase in the absence of HF-BF₃-polyalkylbenzene complex. The presence of an HF-BF₃ polyalkylbenzene complex vastly increases the solubility of benzene and toluene and other mono-alkylbenzenes in the HF-BF₃ acid phase. It has been found that a good rule of the thumb measure of the capacity of an HF-BF₃ acid phase for dissolving of benzene and toluene is about 1 mole of benzene and toluene or other mono-alkylbenzene present in physical solution in the HF-BF₃ acid phase for each mole of HF-BF₃-polyalkylbenzene complex present in the acid phase. For example, a liquid HF acid phase containing 1 mole of xylene in the form of an HF-BF₃ xylene complex will dissolve 1 mole of benzene and/or toluene.

The presence of a separate hydrocarbon acid phase in the system at the completion of the interaction has an adverse effect on the overall yield in that some of the mono-alkylbenzene and di-alkylbenzene formed in the back-up interaction will be dissolved in the separate hydrocarbon phase and will not be available for further interaction. The presence of a separate hydrocarbon phase consisting of non-aromatic hydrocarbon is particularly disadvantageous. The complex-containing HF-BF₃ acid phase has an appreciable solubility for non-aromatic hydrocarbons and roughly up to about 3% by volume of non-aromatic hydrocarbons are tolerable in the total charge to the interaction process, without forming a significant amount of a separate non-aromatic hydrocarbon phase. The total charge is the defined polyalkylbenzene donor, the defined benzene hydrocarbon receiver, non-aromatic hydrocarbons, if any are present, and possibly trialkylbenzenes. It is preferred to operate with a charge that is essentially free of non-aromatic hydrocarbons and which is essentially free of trialkylbenzenes.

The treating agent utilized in the process consists of liquid hydrogen fluoride and boron trifluoride. In order to avoid hydrate formation and reduce corrosion, the process is carried out under substantially anhydrous conditions. The liquid HF utilized should not contain more than about 3% of water. The commercial grade anhydrous hydrofluoric acid is suitable for the process.

Sufficient liquid HF must be present not only to participate in the formation of an HF-BF₃ complex with polyalkylbenzene present in the interaction zone (it is believed 1 mole of HF is necessary per mole of alkylbenzene containing two or more alkyl groups), but also enough to dissolve the HF-BF₃ complex which has been formed. The presence of a distinct separate acid phase indicates that at least the minimum amount of liquid HF is present. More than this minimum amount should be used. In general, at least about 3 moles of liquid HF are used per mole of aromatic hydrocarbon charged to the process. More than this amount can be used, for example 50 moles or more. It is preferred to operate with between about 6 and 12 moles of liquid HF per mole of defined polyalkylbenzene and benzene hydrocarbon receiver charged to the process.

The boron trifluoride in the HF-BF₃ agent appears to be the chief factor determining the ultimate degree of conversion of the defined polyalkylbenzene; that is, assuming that a sufficient amount of benzene hydrocarbon receiver is present. It appears that 1 mole of $BF_3$ and 1 mole of HF form a complex with 1 mole of alkylbenzene containing 2 or more alkyl groups. Some conversion will take place under proper conditions of temperature and time when using very small amounts of $BF_3$. This process utilizes at least 1 mole of $BF_3$ for each mole of the defined polyalkylbenzene donor charged. More than this amount increases the degree of conversion and it is preferred to operate with sufficient $BF_3$ to provide at least 1 mole of $BF_3$ for each mole of alkylbenzene containing 2 or more alkyl groups that are present in the reaction product mixture. Another measure of the amount of $BF_3$ which will produce the maximum yield of trialkylbenzene, other conditions of operation being set for these maximum yields, is the use of about 1 mole of $BF_3$ for each mole of aromatic hydrocarbon charged to the interaction.

At the end of the interaction, the contents of the reaction zone are treated to recover the hydrocarbon reaction product mixture. The simplest method of recovering the hydrocarbons from the acid phase is to contact the acid phase with cold aqueous medium or a cold aqueous alkaline medium. In the laboratory, a particularly suitable technique is to contact the acid phase with crushed ice which has been chilled to Dry ice-acetone temperature. The hydrocarbons are released from the complex and solution and form an upper oil layer above a lower aqueous acid layer. The hydrocarbons may then be decanted and treated to remove an occluded aqueous acid phase.

In a commercial operation, it is necessary to recover both the HF and the $BF_3$ in a form suitable for reuse in the process. It is possible to distill the HF and $BF_3$ away from the hydrocarbons present in the acid phase. The maximum temperature at which the distillative removal of HF and $BF_3$ is carried out is determined by the type of alkyl group present in the acid phase. Although the 1,3,5-trialkylbenzene configuration is extremely stable, cracking reactions occur at fairly low temperatures when the alkyl groups are isopropyl, sec-butyl, and n-butyl. The methyl and ethyl groups are comparatively quite stable and the distillative removal of HF and $BF_3$ may proceed at temperatures as high as about 175° C. In general, it is best to carry out the decomposition of the acid phase into HF-BF₃ and liquid hydrocarbon products at as low a temperature as practical. The distillation may be accomplished at ordinary atmospheric temperature such as 25° C. by the use of vacuum.

Under the conditions set out in this process, not only does interaction take place, but also isomerization and disproportionation may take place. For example, when using a xylene as the receiver, temperature and time utilized may result in the conversion of ortho- and/or para-xylenes to the meta-xylene and also may result in the formation of mesitylene. The trialkylbenzenes formed in the process are, within the error of infrared spectrometry, essentially pure 1,3,5-trialkylbenzene. Relatively high temperatures of operation favor isomerization of the tetraalkylbenzenes to the 1,2,3,5-configuration, i. e., isodurene, in the case of tetramethylbenzene. Thus, by properly adjusting the amount of $BF_3$, the temperature and time of contacting, it is possible by this process to convert a mixture of tetraalkylbenzene isomers into a reaction product mixture containing 1,3,5-trialkylbenzene as essentially the only trialkylbenzene product and 1,2,3,5-tetraalkylbenzene as essentially the only tetraalkylbenzene present.

METHYL GROUP TRANSFER

In addition to control of the amount of liquid HF and BF₃ and the ratio of receiver to donor, the temperature of contacting and the time of contacting must be controlled in order to obtain the desired reaction product mixture. The time and temperature are related and differ for each class of alkyl groups.

In the methyl group transfer process wherein a polymethylbenzene containing at least 4 methyl groups is interacted with a benzene hydrocarbon receiver selected from the class consisting of benzene, toluene and xylene, the maximum temperature of operation is imposed by cracking reactions resulting in the formation of gas and tar. This maximum temperature is about 175° C. As the temperature of contacting is decreased, the interaction rate also decreases. Thus, at a temperature of about 30° C., the rate of methyl group transfer is so slow that the necessary contacting time is impractically long; therefore, the lower limit of feasible operability is about 30° C.

At any given temperature of operation, the degree of conversion—assuming all other variables except time are fixed—is determined by the time of contacting. It is to be understood that the reaction product mixture attains a substantially constant distribution after a definite period of time at a particular temperature and that times in excess of this are not necessary and may be undesirable in that they cause side reactions such as disproportionation or cracking. As a general statement, the lower the temperature of operation, the longer the contacting time needed to obtain an appreciable amount of the desired 1,3,5-trialkylbenzene and further, the longer the time needed to sustain substantially constant product mixture disproportionation.

A further complication in the process is introduced by the difference in rate of mobility of methyl groups between the various polymethylbenzenes, i. e., tetramethylbenzene, pentamethylbenzene and hexamethylbenzene. Thus, in the case of tetramethylbenzene at an interaction temperature of 100° C., a substantially constant product mixture is attained in a time of about 30 minutes. On the other hand, when hexamethylbenzene is interacted at about 100° C., the time for the attainment of a substantially constant product mixture distribution is on the order of 6 hours. Tetramethylbenzene, at a temperature of 60° C., attains a reaction product mixture in about 6 hours. Hexamethylbenzene, at a temperature of 140° C., attains a substantially constant reaction product mixture in about 30 minutes. It is to be understood that the time and temperature relationship set out above involves the use of a benzene hydrocarbon receiver such that the reaction product mixture when charging hexamethylbenzene and when charging tetramethylbenzene will be approximately the same. Operation at temperatures intermediate the temperatures given above will require times intermediate those given above, that is, the lower the temperature of contacting, the longer the time of contacting.

In addition to the relationship of time and temperature required to attain a substantially constant reaction product mixture distribution, the disproportionation of the benzene hydrocarbon receiver to mesitylene imposes a practical upper limit to the methyl group transfer process. This is particularly true when the receiver is a xylene. At temperatures in excess of about 80° C., xylene readily disproportionates to a mixture of toluene and mesitylene; at these elevated temperatures, toluene will also disproportionate in significant amounts to xylene and mesitylene. Therefore, when utilizing toluene and xylene as the methyl group receivers, it is preferred to operate at a temperature between about 50° and about 80° C. for a length of time sufficient to reach the maximum practical degree of conversion to mesitylene, i. e., 1,3,5-trimethylbenzene.

ETHYL GROUP TRANSFER

Ethyl groups are much more mobile than are methyl groups. Thus, ethylbenzene and diethylbenzene very readily disproportionate to form diethylbenzene and triethylbenzene and, in some cases, tetraethylbenzenes. In order to utilize the receiver to the maximum and also eliminate the complication of these disproportionation reactions, it is preferred to use benzene, toluene or xylene as the ethyl group acceptor in the ethyl group transfer from a polyethylbenzene such as tetraethylbenzene, pentaethylbenzene or hexaethylbenzene or a polyalkylbenzene containing both ethyl and methyl groups. Examples of these mixed methylethylbenzenes are diethyldimethylbenzene, ethyltrimethylbenzene, methyltriethylbenzene, triethyldimethylbenzene and tetraethyldimethylbenzene. When operating with a mixed methylethylbenzene as the donor, the ethyl groups transfer to the receiver so that the composition of the product trialkylbenzene will vary with the number of methyl and ethyl groups present on the original polyalkylbenzene donor. For example, ethyltrimethylbenzene will produce mesitylene as the product, whereas diethyldimethylbenzene will produce 1,3,5-ethylxylene as the product.

Decomposition of the alkylbenzene with formation of gas and tar takes place at temperatures above about 175° C. The ethyl group is sufficiently mobile that, if the correspondingly long time is tolerable, the ethyl group transfer process is operable at temperatures as low as about 0° C. Operation at this low temperatures may require a time of several months for the attainment of the substantially constant reaction product mixture distribution.

The type of polyalkylbenzene donor affects the relationship of time and temperature in the ethyl group transfer process as well as in the methyl group transfer process. In the case of hexaethylbenzene, a period of about 2 weeks is necessary to attain the desired maximum conversion at a temperature of about 20° C. whereas charging tetraethylbenzene at this temperature of 20° C. the desired maximum conversion is attainable in about 3 days. Substantially maximum conversion of hexaethylbenzene is obtainable at 100° C. in about 30 minutes whereas when charging tetraethylbenzene, substantially complete conversion is attained in 30 minutes at 60° C. The time and temperature relationship will be somewhat different when charging mixed methylethylbenzenes than when charging only polyethylbenzene.

When utilizing toluene and/or xylene as the ethyl group acceptor, the practical maximum temperature of operation is about 80° C. However, the mobility of the ethyl group is such that it is possible to operate at temperatures sufficiently low to avoid methyl group shift without requiring prohibitive times of contacting.

SECONDARY ALKYL GROUP TRANSFER

It has been found that, within the experimental error, that the secondary alkyl groups, isopropyl and sec-butyl, are essentially equivalent for the back-up interaction. The polyalkylbenzene donors contain at least 4 alkyl groups and may be either alkylbenzenes containing only isopropyl and/or sec-butyl groups or may be mixtures of alkyl groups selected from the class of methyl, ethyl, n-propyl, and n-butyl. Examples of these polyalkylbenzenes are tetraisopropylbenzene, tetra-sec-butylbenzene, di-isopropyldimethylbenzene, di-isopropyldiethylbenzene, isopropyltrimethylbenzene, isopropyltriethylbenzene, isopropyltetramethylbenzene, and sec-butyltriethylbenzene. Although the isopropyl and sec-butyl groups are much more mobile than ethyl groups or n-propyl or n-butyl groups, it is very difficult to avoid transfer of these other groups. Thus, operation with polyalkylbenzene donors containing defined groups other than isopropyl, sec-butyl and methyl, tends to produce a hodge podge of alkylbenzenes in the reaction product mixture. The term "hodge podge" implies a mixture of alkylbenzenes containing 2 or more different alkyl groups in the trialkylbenzene fraction. It is preferred to operate with polyalkylbenzenes containing only isopropyl or only sec-butyl or one of these and methyl as the alkyl groups on said polyalkylbenzene.

The sec-butyl group acceptors are selected from the class consisting of benzene, toluene, xylene, sec-butylbenzene and di-sec-butylbenzene. When an alkylbenzene containing only sec-alkyl groups is desired, the preferred benzene hydrocarbon receiver is benzene.

Not only are the isopropyl and sec-butyl groups extremely mobile by comparison with methyl and even ethyl groups, but are also much more sensitive to temperature. Thus, cracking reactions limit the upper temperature of operation of the sec-alkyl group transfer process to about 80° C. and the practical maximum is about 60° C. On the other hand, the mobility is such that rather low temperatures can be used without excessive contacting times. The lower limit of operability is about −20° C.

At a temperature of +20° C., a substantially constant product mixture distribution is obtainable in about 30 minutes and this product mixture is attainable in about 2 minutes at a temperature of 50° C., that is, the longer times corresponding to the lower temperatures.

The mobility of the sec-alkyl groups is such that there is substantially no difference in the time and temperature relationship when the polyalkylbenzene donor contains both methyl groups and sec-alkyl groups.

n-ALKYL GROUP TRANSFER

Although the mobility of n-propyl groups and n-butyl groups is not substantially the same, these 2 alkyl groups behave in a sufficiently similar manner to permit teachings with respect to one to apply substantially to the other. The n-propyl group is more mobile than the n-butyl group. Surprisingly, the n-butyl group is much more susceptible to cracking reactions than is the n-propyl group.

The n-alkyl group acceptors are selected from the class consisting of benzene, toluene, xylene, n-alkylbenzene and di-n-alkylbenzene; the dialkylbenzene may be n-alkylmethylbenzene.

The polyalkylbenzene may be an n-alkylbenzene containing at least 4 n-propyl or n-butyl groups or may be a mixed alkylbenzene containing at least 1 n-alkyl group and the remainder methyl groups.

Cracking reaction impose an upper limit of about 100° C. on the n-alkyl group transfer process. The mobility of these group impose a lower limit of about 0° C. on the process. A substantially constant reaction product mixture distribution is attainable when interacting tetra-n-propylbenzene in about 1 hour at 80° C. and in about 6 hours at 50° C., the longer times corresponding to the lower temperatures. In general, at the same temperature of operation, tetra-n-butylbenzene will require a somewhat longer time to attain the maximum conversion.

ILLUSTRATIVE RESULTS

The results obtainable by the invention are illustrated by several examples set out below. The runs were carried out using a steel reactor provided with a 1725 R. P. M. stirrer. The order of addition of materials to the reactor was: (1) a preformed solution of donor and receiver, (2) commercial grade anhydrous liquid HF and (3) commercial grade BF₃. The contents of the reactor were agitated during the addition of the HF and BF₃; the agitation was continued while the reactor was brought to the desired contacting temperature and maintained during the contacting time. The contents of the reactor were withdrawn into a vessel filled with crushed ice. An upper hydrocarbon layer formed above a lower aqueous layer. The hydrocarbon layer was decanted and washed with dilute ammonium hydroxide solution to remove HF and BF₃. The neutral hydrocarbons were water washed to remove traces of ammonium hydroxide.

The reaction product hydrocarbons were fractionated in a laboratory distillation column provided with about 30 theoretical plates. Each product fraction was analyzed by a combination of boiling point, specific gravity, refractive index, and ultraviolet and infrared technique.

The results of interacting hexaethylbenzene and various alkylbenzenes are set out in Table II.

TABLE II

*"Back-up" of hexaethylbenzene*

| Run No | 1 | 2 | 3 | 4 | 5 |
|---|---|---|---|---|---|
| Benzene Hydrocarbon | Toluene | Toluene | m-xylene | m-xylene | Mesitylene |
| Donor, moles | 0.33 | 0.41 | 0.41 | 0.41 | 0.32 |
| Receiver, moles | 2.51 | 3.08 | 2.95 | 2.95 | 2.34 |
| Receiver/Donor, mole ratio | 7.6 | 7.5 | 7.2 | 7.2 | 7.5 |
| Donor, Percent in charge | 11.6 | 11.7 | 12.2 | 12.2 | 12 |
| Temperature, °C | 5 | 65 | 17 | 100 | 3 |
| Time, Hours | 1.0 | 1.0 | 70.0 | 0.5 | 2.5 |
| Liquid HF, moles | 26.0 | 27.0 | 30.0 | 30.0 | 20.0 |
| $BF_3$, moles | 3.10 | 2.13 | 4.93 | 4.93 | 1.60 |
| HF/D+R, mole ratio | 9.2 | 7.8 | 9.0 | 9.0 | 7.5 |
| $BF_3$/D+R, mole ratio | 1.1 | 0.9 | 1.47 | 1.47 | 0. |

REACTION PRODUCT DISTRIBUTION, MOLE PERCENT

| | | | | | |
|---|---|---|---|---|---|
| Benzene | 0.0 | Trace | 0.0 | 4.0 | 0 |
| Ethylbenzene | 0.0 | Trace | 0.0 | 0.0 | 0 |
| 1,3-diethylbenzene | 0.0 | 0.0 | 0.0 | 0.0 | 0 |
| 1,3,5-triethylbenzene | 0.2 | 3.1 | 4.8 | 20.4 | 0 |
| Tetraethylbenzene | 0.0 | 0.0 | 0.0 | 0.0 | 0 |
| Pentaethylbenzene | 0.0 | 0.0 | 0.0 | 0.0 | 0 |
| Hexaethylbenzene | 11.5 | 9.1 | 7.4 | 0.0 | 88 |
| Toluene | 88.1 | 78.4 | | 10.2 | |
| 1,3-ethyltoluene | 0.2 | 9.4 | | 0.0 | |
| 1,3,5-diethyltoluene | 0.0 | 0.0 | | 0.0 | |
| m-xylene | | | 74.3 | 7.1 | |
| 1,3,5-ethylxylene | | | 14.5 | 33.0 | |
| Mesitylene | | | | 25.3 | 12 |
| Other ethylbenzenes | | | | 0.0 | 0 |

Runs 1 and 2 were carried out using toluene as the ethyl group acceptor under substantially the same conditions of operation except for temperature. In run No. 1, carried out at 5° C. for a time of 1 hour, a detectable amount of 1,3,5-triethylbenzene was formed. The ethylated toluene product was 1,3-ethyltoluene. In run No. 2, about 25% of the hexaethylbenzene charged was converted to 1,3,5-triethylbenzene. No tetraethylbenzene or pentaethylbenzene was detected in the reaction product mixture. Within the error of infrared spectrometry, the triethylbenzene product was pure 1,3,5-triethylbenzene.

Runs 3 and 4 were carried out using meta-xylene as the ethyl group acceptor. Run No. 3 was carried out at somewhat below room temperature (17° C.) and for a time of 70 hours. Under these conditions, about 40% of the hexaethylbenzene was converted. The reaction product mixture contained 1,3,5-triethylbenzene as the only triethylbenzene and 1,3,5-ethylxylene as the only ethylxylene. No diethylxylene was found and no tetraethylbenzene.

Run No. 4 was carried out at 100° C. for a time of 30 minutes. Under these conditions all of the hexaethylbenzene disappeared without formation of either tetraethylbenzene or pentaethylbenzene. The reaction product mixture showed that not only did the meta-xylene go to the 1,3,5-ethylxylene, but it also disproportionated to form a trimethylbenzene fraction consisting of pure mesitylene. Under these conditions, about 80% of the meta-xylene was converted either to 1,3,5-ethylxylene or mesitylene.

Run No. 5 was carried out to determine the possibility of interacting a stable trimethylbenzene and hexaethylbenzene. At 3° C. and a time of 2.5 hours, no detectable amount of interaction occurred. It is of interest that in run No. 4 at a temperature of 100° C. no tetramethylbenzene was produced despite the 80% conversion of meta-xylene by interaction and disproportionation.

In Table III there are shown the results of the interaction of a mixture of ethylxylenes with xylene. The feed was a mixture of ethylxylenes containing 1 or more ethyl groups, i. e., ethylxylene, diethylxylene and triethylxylene. This mixture of ethylxylenes was obtained by reacting meta-xylene and ethylene using HF-BF₃ catalyst.

TABLE III

| Run No | 6 | 7 | 8 |
|---|---|---|---|
| Charge, moles | | [a] 0.9 | [a] 0.9 |
| m-xylene, moles | 6.5 | | |
| Ethylene, moles | 7.2 | | |
| HF, moles | 60.0 | 29.0 | 30.0 |
| $BF_3$, moles | 10.5 | 4.3 | 4.2 |
| HF/Xylene, mole ratio | 9.2 | 32.1 | 33.3 |
| $BF_3$/Xylene, mole ratio | 1.62 | 4.8 | 4.7 |
| Temperature, °C | 15 | 16 | 60 |
| Time, Minutes | 15 | 66 (hours) | 30 |

REACTION PRODUCT DISTRIBUTION, MOLE PERCENT

| | | As is | Corr.[b] | As is | Corr.[b] |
|---|---|---|---|---|---|
| m-xylene | 27 | 2 | 4 | 5 | 9 |
| Ethyxylene | 46 | 83 | 68 | 84 | 71 |
| Diethylxylene | 22 | 13 | 24 | 10 | 18 |
| Triethylxylene | 5 | 2 | 4 | 1 | 2 |
| Other | 0 | 0 | 0 | 0 | 0 |

[a] Product from Run 6.
[b] Eliminating ethylxylene in charge.

Run No. 6 shows the conditions under which the alkylation was carried out and the result thereof. Ethylene was added to the above described reactor containing meta-xylene, HF, and BF₃ over a period of 15 minutes and a temperature of 15° C. Immediately after the ethylene addition was stopped, the contents of the reactor were passed into crushed ice at Dry Ice-acetone temperature. The reaction product mixture showed that about 75% of the xylene had been ethylated to a mixture of ethylxylene, diethylxylene, and triethylxylene. Infrared analysis indicated that the ethylxylene fraction was about two-thirds 1,3,5-ethylxylene and the remainder was about equally divided 1,3,4-ethylxylene and 1,2,3-ethylxylene.

The total mixture of xylene and ethylxylenes obtained in run No. 6 was divided into two portions and these portions used as the feed to runs 7 and 8.

Run No. 7 was carried out at 16° C. for a time of 66 hours. The final reaction product mixture contained 83% of ethylxylene which was pure 1,3,5-ethylxylene; this indicates that the 1,3,4- and 1,2,3-ethylxylenes were isomerized to the 1,3,5- configuration. After subtracting the ethylxylene already present in the charge, the corrected reaction product mixture contains 68% of 1,3,5-ethylxylene, 24% of diethylxylene, 4% of triethylxylene and 4% of meta-xylene. The large amount of diethylxylene and triethylxylene present in the reaction product mixture is due to the fact that the amount of xylene present in the charge was only 85% of the theoretical necessary to completely convert the polyethylxylenes to ethylxylene.

Run No. 8 was carried out at 60° C. for a time of 30 minutes. The reaction product distribution here is substantially the same as that of run No. 7, indicating that this is about the maximum degree of conversion under these conditions. After subtracting for the ethylxylene present in the charge, the reaction product mixture contains 71% of 1,3,5-ethylxylene or about the same as that in run No. 7.

Runs 6 through 8 show that by the process of this invention the ethylate from the ethylation of xylene in the presence of HF and BF$_3$ catalyst can be converted, after adjusting the xylene content, to a material containing substantially the mono-alkylate, which mono-alkylate is the single isomer 1,3,5-ethylxylene.

Thus having described the invention, what is claimed is:

1. A process for preparing 1,3,5-trialkylbenzene by alkyl group transfer, which process comprises (I) under substantially anhydrous conditions, contacting (a) (i) donor polyalkylbenzene containing at least 4 alkyl groups and (a) (ii) at least one receiver from the class consisting of benzene, alkylbenzene and dialkylbenzene with (b) (i) liquid HF in an amount at least sufficient to form a distinct separate acid phase and (b) (ii) BF$_3$ in an amount appreciably more than 1 mole per mole of said donor, (c) at about the temperature set out in the schedule herein and for a time sufficient to produce an appreciable amount of 1,3,5-trialkylbenzene, (II) removing HF and BF$_3$ to recover a hydrocarbon reaction product mixture and (III) recovering 1,3,5-trialkylbenzene from said mixture, wherein the relationship between the class of donor, as expressed by the type of alkyl group present in the donor, and the alkylbenzene receiver as expressed by the type of alkyl group present therein, and the temperature for each class of donor is set out in the annexed schedule:

| Donor Class | Donor Alkyl Group Selected From— | Alkylbenzene Receiver Alkyl Group Selected From— | Temperature, ° C. |
| --- | --- | --- | --- |
| A | Methyl | Methyl | 30 to 175. |
| B | Ethyl and Methyl with at least one Ethyl. | Methyl and Ethyl | 0 to 175 |
| C | Isopropyl and sec-butyl. | Methyl, Isopropyl and sec-butyl. | −20 to 80 |
| D | n-propyl and n-butyl. | Methyl, n-propyl and n-butyl. | 0 to 100 |

2. A methyl group transfer process which comprises, under substantially anhydrous conditions (A) contacting (1) a polymethylbenzene donor containing at least 4 methyl groups and (2) at least one receiver selected from the class consisting of benzene, toluene and xylene with (3) liquid HF in an amount at least sufficient to form a distinct separate acid phase and (4) BF$_3$ in an amount appreciably more than 1 mole per mole of said polymethylbenzene, (5) at a temperature between about 30° C. and about 175° C. for a time sufficient to produce an appreciable amount of 1,3,5-trimethylbenzene, (B) removing HF and BF$_3$ to recover a hydrocarbon reaction product mixture and (C) recovering 1,3,5-trimethylbenzene from said mixture.

3. The process of claim 2 wherein the amount of liquid HF is between about 3 moles and about 50 moles per mole of aromatic hydrocarbon charged to the contacting zone.

4. The process of claim 2 wherein the amount of BF$_3$ is at least about 1 mole per mole of aromatic hydrocarbon charged to the contacting zone.

5. The process of claim 2 wherein the mole ratio of receiver to donor is at least $(X-3)/(3-Y)$ where X is the number of methyl groups in said donor and Y is the number of methyl groups in said receiver.

6. The process of claim 2 wherein the receiver is xylene and the temperature is between about 50° and about 80° C.

7. The process of claim 2 wherein the receiver is toluene and the temperature is between about 50° and about 80° C.

8. A methyl group transfer process which comprises contacting, under substantially anhydrous conditions, hexamethylbenzene and benzene in a mole ratio of benzene to hexamethylbenzene of at least 1, with between about 6 and 12 moles of liquid HF per mole of hexamethylbenzene and benzene charged and with at least 1 mole of BF$_3$ per mole of hexamethylbenzene and benzene charged at a temperature between about 100° and about 140° C. for a time between about 30 minutes and about 6 hours, the longer times corresponding to the lower temperatures, removing HF and BF$_3$ to recover a hydrocarbon reaction product mixture containing 1,3,5-trimethylbenzenes as essentially the only trimethylbenzene and recovering 1,3,5-trimethylbenzene from said mixture.

9. An ethyl group transfer process which comprises, under substantially anhydrous conditions, (A) contacting (1) a polyalkylbenzene donor containing at least 4 alkyl groups selected from the class consisting of methyl and ethyl where at least 1 is an ethyl group and (2) at least one receiver selected from the class consisting of benzene, toluene, xylene, ethylbenzene, diethylbenzene and ethyltoluene with (3) liquid HF in an amount at least sufficient to form a distinct separate acid phase and (4) BF$_3$ in an amount appreciably more than 1 mole per mole of said polyalkylbenzene, at (5) a temperature between about 0° C. and 175° C. for a time sufficient to produce an appreciable amount of 1,3,5-trialkylbenzene, (B) removing HF and BF$_3$ to recover a hydrocarbon reaction product mixture and (C) recovering 1,3,5-trialkylbenzene from said mixture.

10. The process of claim 9 wherein said polyalkylbenzene is a polyethylbenzene.

11. The process of claim 9 wherein said polyalkylbenzene is a dimethyldiethylbenzene.

12. The process of claim 9 wherein the mole ratio of receiver to donor is at least $(D-3)/(3-R)$ where D is the number of alkyl groups in said donor and R is the number of alkyl groups in said receiver.

13. The process of claim 9 wherein said receiver is benzene.

14. The process of claim 9 wherein said receiver is xylene and the temperature is between about 0° C. and 80° C.

15. An ethyl group transfer process which comprises contacting, under substantially anhydrous conditions, hexaethylbenzene and benzene in a mole ratio of benzene to hexaethylbenzene of at least 1 with between about 6 and 12 moles of liquid HF per mole of hexaethylbenzene and benzene charged and with at least 1 mole of BF$_3$ per mole of hexaethylbenzene and benzene charged, at a temperature between about 20° C. and 100° C. for a time between about 30 minutes and about 2 weeks, the longer times corresponding to the lower temperature, removing HF and BF$_3$ to recover a hydrocarbon reaction product mixture containing 1,3,5-triethylbenzene as essentially the only triethylbenzene and recovering 1,3,5-triethylbenzene from said mixture.

16. An ethyl group transfer process which comprises contacting, under substantially anhydrous conditions, tetraethylbenzene and benzene in a mole ratio of benzene to tetraethylbenzene of at least about 1 with between about 6 and 12 moles of liquid HF and at least 1 mole of BF$_3$, respectively, per mole of tetraethylbenzene and benzene charged, at a temperature between about 20° C. and 60° C. for a time between about 30 minutes and 3 days, the longer times corresponding to the lower temperatures, removing HF and $BF_3$ to recover a hydrocarbon reaction product mixture containing 1,3,5-triethylbenzene as essentially the only triethylbenzene and recovering 1,3,5-triethylbenzene from said mixture.

17. A secondary alkyl group transfer process which comprises, under substantially anhydrous conditions, (A) contacting (1) a polysec-alkylbenzene donor containing at least 4 sec-alkyl groups and (2) at least one receiver selected from the class consisting of benzene, toluene, xylene, sec-alkyltoluene, sec-alkylbenzene and di-sec-alkylbenzene, said sec-alkyl group being selected from the class consisting of isopropyl and secondary butyl, with (3) liquid HF in an amount at least sufficient to form a distinct separate acid phase and (4) $BF_3$ in an amount appreciably more than 1 mole per mole of said polysec-alkylbenzene, at (5) a temperature between about $-20°$ C. and $+80°$ C. for a time sufficient to produce an appreciable amount of 1,3,5-tri-sec-alkylbenzene, (B) removing HF and $BF_3$ to recover a hydrocarbon reaction product mixture and (C) recovering 1,3,5-tri-sec-alkylbenzene from said mixture.

18. An n-alkyl group transfer process which comprises, under substantially anhydrous conditions, (A) contacting (1) a poly-n-alkylbenzene donor containing at least 4 n-alkyl groups and (2) at least one receiver selected from the class consisting of benzene, toluene, xylene, n-alkyltoluene, n-alkylbenzene, and di-n-alkylbenzene, said n-alkyl groups being selected from the class consisting of n-propyl and n-butyl, with (3) liquid HF in an amount at least sufficient to form a distinct separate acid phase and (4) $BF_3$ in an amount appreciably more than 1 mole per mole of said poly-n-alkylbenzene, at (5) a temperature between about 0° and 100° C. for a time sufficient to produce an appreciable amount of 1,3,5-tri-n-alkylbenzene, (B) removing HF and $BF_3$ to recover a hydrocarbon reaction product mixture and (C) recovering 1,3,5-tri-n-alkylbenzene from said mixture.

References Cited in the file of this patent
UNITED STATES PATENTS

| | | |
|---|---|---|
| 2,416,184 | Lee et al. | Feb. 18, 1947 |
| 2,420,073 | Frey | May 6, 1947 |
| 2,528,893 | Lien et al. | Nov. 7, 1950 |

OTHER REFERENCES

McCaulay et al.: Jour. Am. Chem. Soc., vol. 75 (May 1593), pp. 2411-13.

Lien et al.: Jonr. Am. Chem. Soc., vol. 75 (May 1953), pp. 2407-10.